United States Patent [19]

Takei

[11] 4,332,834

[45] Jun. 1, 1982

[54] METHOD OF MANUFACTURING A MAGNETIC RECORDING MEDIUM

[75] Inventor: Yutaka Takei, Sendai, Japan

[73] Assignee: Sony Corporation, Tokyo, Japan

[21] Appl. No.: 235,583

[22] Filed: Feb. 18, 1981

[30] Foreign Application Priority Data

Feb. 22, 1980 [JP] Japan .................................. 55/21788

[51] Int. Cl.$^3$ .............................................. B05D 3/14
[52] U.S. Cl. ....................................... 427/48; 427/128
[58] Field of Search ................................ 427/127–132, 427/48; 428/900, 694

Primary Examiner—Bernard D. Pianalto
Attorney, Agent, or Firm—Hill, Van Santen, Steadman, Chiara & Simpson

[57] ABSTRACT

Improved orientation method is disclosed which is used in manufacturing magnetic recording medium.

The method comprises the steps of, applying magnetic paint composed mainly of acicular magnetic powder, binder and solvent on a non-magnetic substrate to form a magnetic coating layer, passing the magnetic coating layer through a magnetic field to apply an orientation magnetic field to align the magnetic powder along a predetermined direction while the coating layer is still wet and the powder is still movable in the paint, and drying the magnetic coating layer, wherein the magnetic coating layer is applied with the orientation magnetic field composed of a plurality of pulse magnetic field along one direction each is stronger than coercive force of the magnetic powder and subsequently applied with a D.C. magnetic field along the same direction and the same polarity as the last pulse magnetic field.

9 Claims, 14 Drawing Figures

METHOD OF MANUFACTURING A MAGNETIC RECORDING MEDIUM

BACKGROUND OF THE INVENTION

1. Field of the Invention

The present invention relates to a method of manufacturing a magnetic recording medium, and especially to a so-called orientation treatment to align magnetic powder in a magnetic layer along a predetermined direction.

2. Prior Art

Magnetic recording medium, such as, magnetic tape used in various magnetically recording and/or reproducing apparatus, for example, audio and/or video tape recorder is formed of a non-magnetic substrate provided with a magnetic coating layer on the surface thereof. The magnetic coating layer is formed by coating a magnetic paint containing acicular magnetic powder, and binder uniformly dispersed in organic solvent. After the magnetic paint is applied on the surface of the substrate, while the paint is still wet and the magnetic powder in the coating layer is still movable, the magnetic tape is passed through a magnetic field to align the magnetic powder along a direction of the magnetic field, and then the coating layer is dried to fix the magnetic powder. By the orientation treatment, magnetic characteristics along the predetermined direction are improved, for example, the rectangular ratio which is a ratio of residual magnetic flux density to saturation magnetic flux density is increased.

In the prior art the orientation treatment was carried out by applying D.C. magnetic field to the magnetic coating layer by a permanent magnet or D.C. electromagnet. In this method, even the strength of the magnetic field was increased intended to increase the effect of the orientation, the orientation effect was not enoughly obtained, and contrary to the expectation surface smoothness of the coating layer was apt to be deteriorated.

Several methods were proposed to improve the orientation treatment. In one method, there is proposed an orientation apparatus including a main orientation magnet of parmanent magnet or D.C. electromagnet generating a magnetic field of one direction accompanied with an electromagnet applied with alternating current to generate a supplemental magnetic field with alternating polarity periodically (A.C. magnetic field) which is superposed on the main magnetic field. In another method, the orientation was carried out by applying D.C. magnetic field along a predetermined direction and an supplemental A.C. magnetic field superposed on the main magnetic field along a direction perpendicular to the direction of the main D, C, magnetic field, or mechanical vibration applied together with the main D.C. magnetic field to improve the alignment of the magnetic powder. In still another method, in addition to the main D.C. magnetic field, A.C. magnetic field was also applied to vibrate the magnetic powder to improve the orientation. However, in all of there prior art method, the orientation was essentially achieved by the main D.C. magnetic field, and the A.C. magnetic field applied was weak just to cause vibrations of the magnetic powder to be easily moved during the orientation treatment.

In the prior art method, in which the orientation was essentially achieved by D.C. magnetic field, even employing A.C. magnetic field supplementally, substantial orientation effect appears even the strength of the orientation magnetic field was less than the coercive force Hc of the magnetic powder, though enoughly high orientation effect couldn't be obtained even applying a D.C. magnetic field stronger than the coercive force of the magnetic powder, and contrary to the expectation, surface smoothness of the magnetic layer became deteriorated as the orientation magnetic field increases, as mentioned previously. There were further such drawbacks that good orientation couldn't be achieved and high rectangular ratio couldn't be obtained, when the magnetic powder which is poor in dispersion characteristics or large in magnetic agglomeration are employed in the paint, and when the paint contains large ratio of powder.

It is considered that the reason why the enoughly high rectangular ratio couldn't be obtained in the prior art method in which the orientation was essentially carried out by D.C. magnetic field, whether or not the supplemental A.C. magnetic field were applied, is that no switching of the polarity of magnetization of the magnetic powder is concerned in the process of the orientation. Here, switching means the changing of the polarity of spontaneous magnetization of each of magnetic powder. As shown in FIG. 1 a magnetic recording medium 1 coated with a magnetic paint containing acicular magnetic powder, binder and solvent is passed through an orientation magnetic field apparatus 2 along an arrow a while the magnetic paint is still wet and the manetic powder is still movable in the paint, and applied with a D.C. magnetic field generated by the orientation magnetic field apparatus 2 during passing in the magnetic field apparatus 2 to orient the acicular magnetic powder along the direction of the magnetic field. In this case, the D.C. magnetic field received by the magnetic powder on the magnetic recording medium does not run up to the desired strength $H_{OR}$ for the orientation suddenly at the enterance for the orientation magnetic field apparatus, however, the magnetic field is gradually increased by an affect of the orientation magnetic field apparatus as the magnetic recording medium comes close to the entrance. The strength of the magnetic field received by the magnetic powder is shown in FIG. 2. Then even the orientation magnetic field $H_{OR}$ is selected stronger than the coercive force Hc of the magnetic powder, the magnetic powder receives the magnetic field not stronger than the coercive force Hc of the magnetic powder for a certain period though it is short. Under the application of such magnetic field not stronger than the coercive force Hc, the switching of the polarity of the magnetization does not occure, however, the magnetic powder itself begins to rotate by the interaction between the magnetization and the magnetic field. In this case, when the spontancous magnetization indicated by an arrow a in FIG. 3A of the magnetic powder 3 is inclined to the direction of the magnetic field, the magnetic powder is relatively easily oriented along the direction of the magnetic field with a rotation angle $\phi$ which is smaller than 90°, while as shown in FIG. 4A, when the spontaneous magnetization indicated by an arrow b is inclined oppositely to the direction of the magnetic field, the magnetic powder has to be rotated with a large angle $\phi$ as much as 180° as shown in FIG. 4A. Then, in this case until the orientation is completed the magnetic powder must be moved largely and long time is necessary to complete the orientation. Further, even the orientation magnetic field is applied for a enoughly long time, the magnetic powder is apt to be entangled with each other since each powder has to be moved largely, and the powder are apt to be fixed on half way of the orientation as shown in FIG. 4B. The tendency is more remarkable, when the powder employed is, as mentioned previously, poor in the dispersion characteristics, or large in magnetic agglomeration. Thus, in the orientation essentially carried out by using the D.C. magnetic field, there is unreasonable movement of magnetic powder which causes entanglement of the magnetic powder, which results in the poor rectangular ratio, even when strong orientation magnetic field is employed. Further there is a drawback that the surface smoothness of the coating layer becomes deteriorated.

OBJECT AND SUMMARY OF THE INVENTION

It is an object of the present invention to provide an improved method of manufacturing a magnetic recording medium.

It is another object of the present invention to provide a method of manufacturing a magnetic recording medium superior in rectangular ratio and orientation ratio.

It is further object of the present invention to provide a method of manufacturing a magnetic recording medium superior in rectangular ratio and orientation ratio without damaging surface smoothness of the magnetic coating layer.

It is still further object of the present invention to provide an improved orientation method used in manufacturing magnetic recording medium which provides an improved magnetic recording medium superior in orientation of magnetic powder and surface smoothness.

According to one aspect of the present invention, there is provided a method of manufacturing a magnetic recording medium comprising the steps of preparing magnetic paint composed mainly of acicular magnetic powder, and binder uniformly dispersed in solvent, coating the magnetic paint on a non-magnetic substrate to form a magnetic coating layer on a surface of the substrate, applying orientation treatment to the magnetic coating layer to orient the magnetic powder along one direction while the magnetic paint is still wet and the magnetic powder is movable in the magnetic paint, drying the magnetic coating layer until the magnetic powder is fixed, wherein the orientation treatment being carried out by applying pulse magnetic field being larger than coercive force of the magnetic powder along one direction and subsequently applying a D.C. magnetic field along the same direction and same polarity as the pulse magnetic field.

The other object, features and advantages of the present invention will become apparent from the following description taken in conjunction with accompanying drawings.

DESCRIPTION OF THE PREFERRED EMBODIMENTS

According to the present invention, in manufacturing a magnetic recording medium, orientation treatment is applied to a magnetic coating layer formed on a non-magnetic substrate to orient magnetic powder in the coating layer along one direction by applying pulse magnetic field along one direction at a number of times, each magnetic field is larger than coercive force of the magnetic powder, and subsequently applying a D.C. magnetic field along one direction and the D.C. magnetic field has the same polarity as the pulse magnetic field. The magnetic coating layer is dried during or just after the orientation treatment to fix the magnetic powder in the coating layer.

Figure 1:
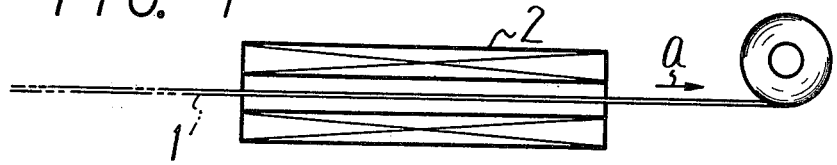
FIG. 1 is a schematic illustration of the orientation treatment in manufacturing the magnetic recording tape.
Figure 2:
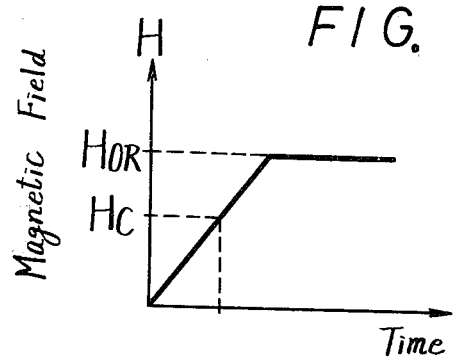
FIG. 2 is a graph to explain the orientation magnetic field of the prior art.
Figure 3A:
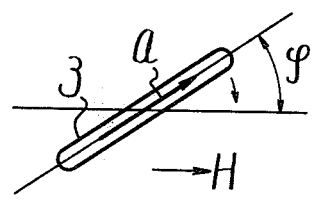
FIGS. 3A, 3B, 4A, 4B and 4C are models to explain the orientation of the prior art.
Figure 3B:
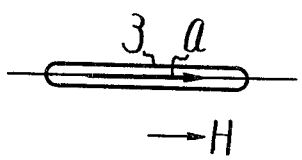
Figure 4A:
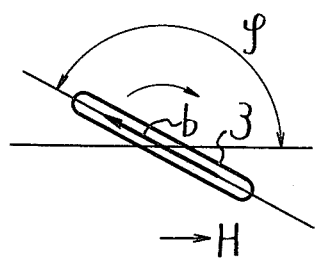
Figure 4B:
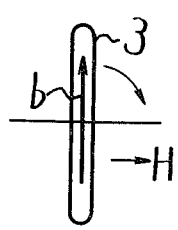
Figure 4C:
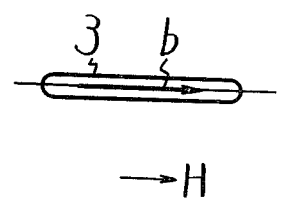
Figure 5:
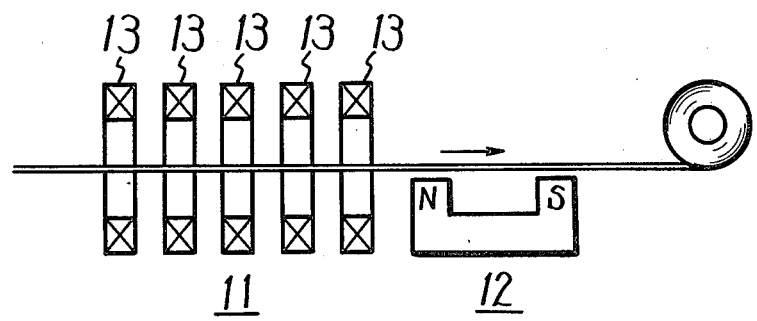
FIG. 5 is a schematic illustration of the orientation treatment according to the present invention.

A non-magnetic substrate, such as, polyethyleneterephthalate film is coated with a magnetic paint composed mainly of acicular magnetic powder and binder uniformly dispersed in solvent on one surface thereof to form a magnetic coating layer. The film having the magnetic coating layer thereon is passed along the arrow as shown in FIG. 5, applied with pulse magnetic field generated by the pulse magnetic field apparatus 11, and then applied with a D.C. magnetic field generated by an magnet 12. The orientation magnetic field maybe applied to the magnetic coating layer during the coating step or just after the coating step. At the rear side with respect to the tape running direction, there is provided a dryer which is not shown in FIG. 5 though, to dry the magnetic coating layer until such condition that the magnetic powder in the coating layer can't move. Thus the rear end of the orientation magnet and the dryer maybe overlapped with each other, for example, the magnet 12 partially provided on the dryer. Various method can be used to dry the coating layer, and one method is to blow the coating layer with warm air.

The pulse magnetic field apparatus 11 is formed of a number of solenoid coils, for example, 5 solenoid coils 13 arranged along a direction of tape pass. Each solenoid coil generates a variable strength pulse magnetic field between 0 and 5KOe along a longitudinal direction of the magnetic tape. The pulse width of not more than 25 msec. can be generated by controlling a power supply to the solenoid coil.

It is important in the present invention that the pulse magnetic field is so constructed that the pulse magnetic field having a strength larger than coercive force of the magnetic field is applied to all of the magnetic powder in the coating layer during the tape running. Thus the length of the solenoid coil along the direction of tape pass and number of solenoid coils are determined in connection with tape running speed and time intervals of pulse magnetic field applied. In FIG. 5, 5 solenoid coils are shown, each generates pulse magnetic field along the longitudinal direction of the magnetic tape, having the same polarity with each other.

Each pulse magnetic field is larger than coercive force of the magnetic powder which cause a switching of polarity of the magnetization. Then the direction of the magnetization pointing an opposite direction to the polarity of the magnetic field is changed to point the direction of the magnetic field. Thus the magnetization of all of the magnetic powder points a direction of the magnetic field.

The pulse magnetic field with pulse width of not more than 25 msec. is important, since the magnetic powder receives a magnetic field smaller than the coercive force of the magnetic powder generated by the pulse orientation magnetic field before entering the orientation magnet apparatus where a pulse magnetic field larger than the coercive force of the magnetic powder. When the pulse width is longer than 25 msec. the magnetic powder receive a magnetic field before entering the orientation magnet apparatus which cause an undesirable rotation of the magnetic powder instead of the switching of the magnetization.

Subsequent to the application of the pulse magnetic field, a D.C. magnetic field is applied to the magnetic coating layer. The D.C. magnetic field has the same polarity as the pulse magnetic field. The stronger D.C. magnetic field results in the better orientation effect. However, too strong D.C. magnetic field is not desirable, since the surface smoothness of the coating layer becomes diteriorated. The D.C. magnetic field should be applied to the magnetic coating layer for enough period to complete the magnetic orientation, for example, at least 70 msec. and more desirably at least 100 msec. This period can be determined by the length of the D.C. magnetic field and the tape running speed.

The D.C. magnetic field should have a strength between 1000 and 3000 Oe, and preferably between 1200 and 2000 Oe. When the strength is below the lower limit, the orientation effect is not enoughly obtained, while the strength is larger than the upper limit, surface smoothness of the magnetic coating layer is apt to be deteriorated.

The magnetic powder employed in manufacturing the magnetic recording medium maybe any one of gamma $Fe_2O_3$ $Fe_3O_4$, a spinel structure constituting an intermediate phase between gamma $Fe_2O_3$ and $Fe_3O_4$, cobalt doped gamma $Fe_2O_3$, cobalt doped $Fe_3O_4$, a cobalt doped spinel structure as aforementioned, chromium dioxide, barium ferrite, various alloys or particles, such as Fe-Co, Co-Ni, Fe-Co-Ni, Fe-Co-B, Fe-Co-Cr-B, Mn-Bi, Mn-Al, Fe-Co-V, and the like, iron nitride or mixture thereof. These powders usually have acicular shape.

The resinous material which is used as a binder can also be one of an extremely wide variety of binders useful in the magnetic recording art. Purely by way of example, we can mention vinyl chloride-vinyl acetate copolymers, vinyl chloride-vinyl acetate-vinyl alcohol copolymers, vinyl chloride-vinyl acetate-maleic acid copolymers, vinyl-chloride-vinylidene chloride copolymers, vinyl chloride-acrylonitrile copolymers, acrylic acid ester-acrylonitrile copolymers, acrylic acid ester-vinyliden chloride copolymers, methacrylic acid esters-vinyliden chloride copolymers, methacrylic acid ester-styrene copolymers, thermoplastic polyulethane resins, phenoxy resins, polyvinyl fluoride resins, vinyliden chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyrals, polyvinyl acetals, cellulose derivatives, styrene-butadiene copolymers, polyester resin, phenolic resins, epoxy resins, thermosetting polyurethane resins, urea resins, melamine resins, alkyd resins, urea formaldehyde resins and mixtures of these materials. When a polyisocyanate curing agent is used as a crosslinking agent for the binder, it is desirable that the amount of curing agent constitutes from 10 to 40 weight percent relative to the total amount of binder.

The non-magnetic base for the magnetic recording medium used in the present invention can also be any of an extremely wide variety of materials. For example materials containing polyester groups such as polyethyleneterephthalate and the like, polyolefin groups such as polypropylene and the like, cellulose derivatives such as cellulose triacetate, cellulose diacetate and the like, polycarbonates, polyvinyle chlorides, polyimides, metallic materials such as aluminum, copper, and the like, as well as paper and the like can be used.

Upon preparing the magnetic paint various materials can be used as an organic solvent. One can use compounds having a ketone group such as acetone, methylethylketone, methylisobutylketone, cyclohexanone and the like. There may be alcohol groups present such as in methanol, ethanol, propanol, butanol and the like. The solvent may include ester groups such as in methyl acetate, ethyle acetate, butyl acetate, ethyl lactate, ethylene glycol acetate monoethylether and the like. It may contain a glycol ether group such as in ethylene glycol-dimethylether, ethylene glycol-monoethylether, dioxane and the like. The solvent may be an aromatic hydrocarbon such as benzene, toluene, xylene, and the like. It may be an aliphatic hydrocarbone such as hexane, heptane and the like. Substituted hydrocarbons such as nitropropane and the like can be used. For the purposes of this invention, these solvents can be used individually or in combination.

The magnetic coating layer of the recording medium may include an abrasive agent such as alminum oxide, chromic oxide, silicon oxide or the like which materials can be used separately or in combination.

The magnetic coating layer may contain lubricant such as higher fatty acid, ester of higher fatty acid and alcohol, silicone oil and so on.

The magnetic coating layer may further contain antistatic agent such as carbon black, and dispersion agent, such as, lecithin.

Next, examples of the present invention will be explained.

EXAMPLE 1

The magnetic paint having the following composition was prepared.

| | |
|---|---|
| α -$Fe_2O_3$(magnetic powder, Hc = 380Oe) | 100.0 parts by weight |
| vinylchloride-vinylacetate-vinylalcohol copolymer (VAGH; trade name, manufactured by Union Carbide Corporation) | 15.0 parts by weight |
| Polyurethane Resin (Estane 5702: trade name, manufactured by B.F. goodrich) | 15.0 parts by weight |
| lecithin (dispersion agent) | 1.0 parts by weight |
| Methyl ethyl ketone (solvent) | 150.0 parts by weight |
| Methyl isobuthyl ketone (solvent) | 150.0 parts by weight |

Figure 6:
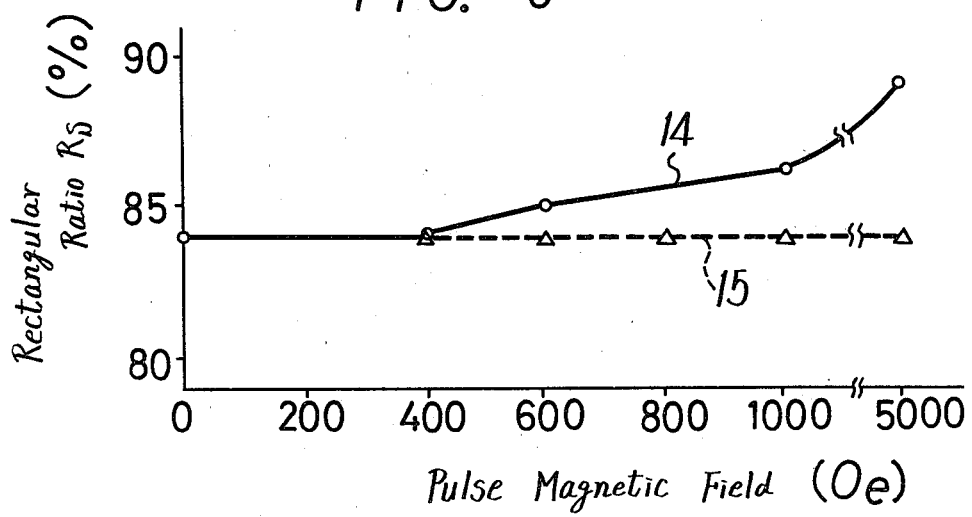
FIGS. 6 and 7 are graphs to show the relation between the orientation magnetic field and the rectangular ratio.

The magnetic paint was coated on a non-magnetic substrate, such as, polyethyleneterephthalate film to form a magnetic coating layer. Thus coated magnetic tape was introduced into the magnetic field apparatus comprising 5 solenoid coils 13 and a permanent magnet 12 as shown in FIG. 5. The pulse width of the magnetic field generated by each of the solenoid coils 13 was 5 msec. and the selenoid coils generated magnetic fields of the same polarity along the longitudinal direction of the magnetic tape. The D.C. magnetic field applied by the permanent magnet was the same polarity and along the same direction as the pulse magnetic field and the strength of the D.C. magnetic field was 1500 Oe. A number of magnetic tapes were thus prepared and measured results were shown in FIG. 6. FIG. 6 is a graph showing the relation between the strength of the pulse magnetic field and the rectangular ratio (Rs), which is a ratio of residual magnetic flux density (Br) to saturation magnetic flux density (Bs), in which the solid line 14 indicates the results according to the present invention where the pulse magnetic field was applied preceding to the application of the D.C. magnetic field, and the dotted line 15 indicates the result when pulse magnetic field having a polarity opposite to the polarity of the D.C. magnetic field was applied. It is understood from the results that no increase of orientation effect was observed when the opposite polarity pulse magnetic field was applied, while increase of the orientation effect represented by the increased value of the rectangular ratio was observed when the pulse magnetic field having the same polarity as the D.C. magnetic field and more than 380 Oe which was coercive force of the magnetic powder was applied preceding to the application of the D.C. magnetic field.

EXAMPLE 2

Figure 7:
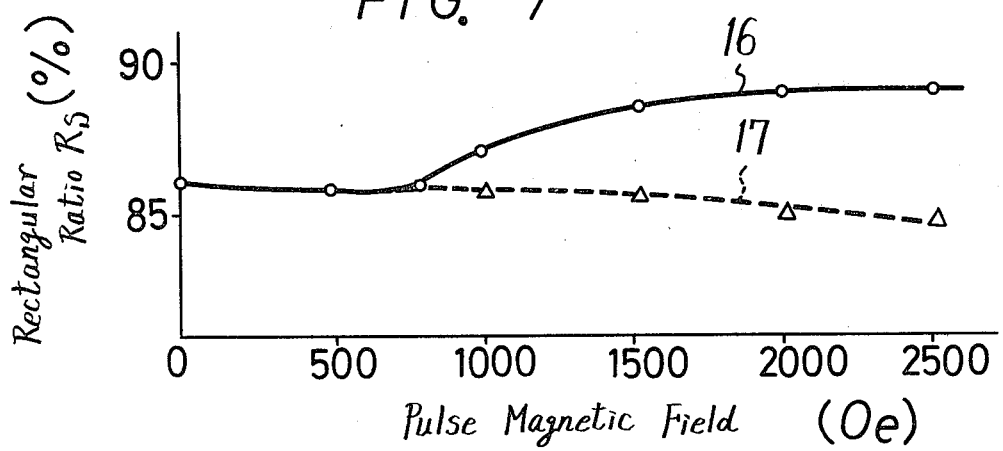

Co adsorbed gamma $Fe_2O_3$ having coercive force of 750 Oe was employed as the magnetic powder of Example 1, and magnetic paint was prepared, coated on a polyethyleneterephthalate film and the orientation was carried out as Example 1. The relation between pulse magnetic field and the rectangular ratio is shown in FIG. 7, in which the solid line 16 indicates the results when the pulse magnetic field having the same polarity as the D.C. magnetic field was applied, and the dotted line 17 indicates the results when the pulse magnetic field having opposite polarity to the D.C. magnetic field was applied. It is understood from FIG. 7 that the orientation effect was increased when the pulse magnetic field of more than coercive force of the magnetic powder was applied to the magnetic coating layer preceding to the application of the D.C. magnetic field.

Figure 8:
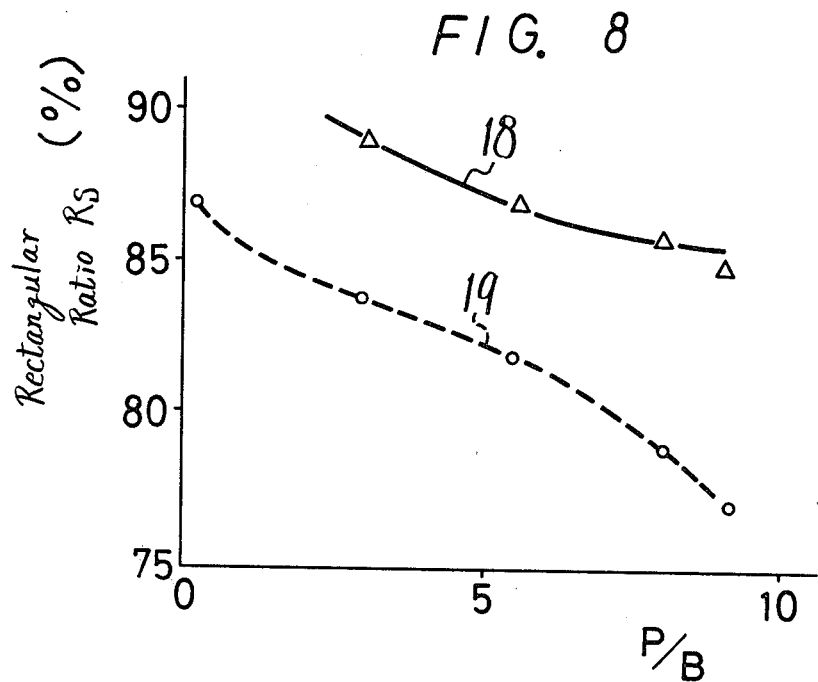
FIG. 8 is a graph showing the relation between the powder to binder ratio and the rectangular ratio.

FIG. 8 shows the relation between a powder to binder ratio (P/B ratio) and the rectangular ratio, in which the solid line 18 indicates the results when the pulse magnetic field having a pulse width of 5 msec. and strength of 5 KOe was applied preceding to the application of the D.C. magnetic field, and the dotted line 19 indicates the results when the orientation was carried out by the D.C. magnetic field without applying the pulse magnetic field previously. In this case, gamma $Fe_2O_3$ having coercive force of 350 Oe was employed as the magnetic powder. As understood from FIG. 8, according to the present invention the decrease of the restangular ratio is avoided as compared with the prior art method.

Figure 9A:
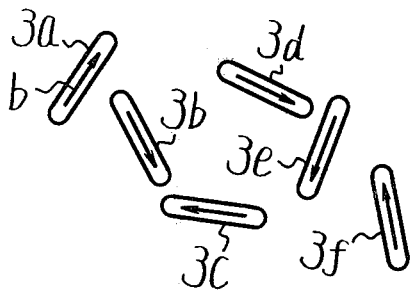
FIGS. 9A, 9B and 9C are models to explain the orientation according to the present invention.
Figure 9B:
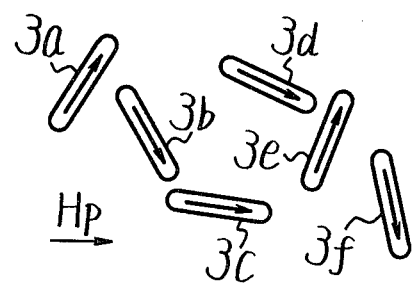
Figure 9C:
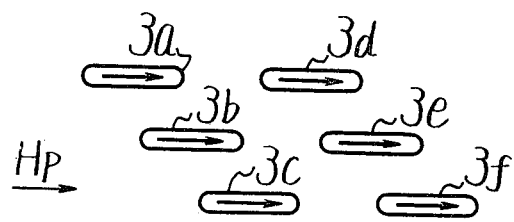

The reason why the superior orientation effect is obtained according to the present invention is considered as follows. When the pulse magnetic field Hp which is larger than coercive force Hc of the magnetic powder is applied to the magnetic powder as shown in FIG. 9A where the magnetization of the powder are pointing randomly, the switching of the magnetization occurs and the magnetization of the magnetic powder change the direction and point the direction of the magnetic field as shown in FIG. 9B. After that, when the D.C. magnetic field H having the same polarity as the pulse magnetic field is applied, torque to rotate the magnetic powder works to align the magnetic powder along the direction of the D.C. magnetic field as shown in FIG. 9C. In this case, rotation angle of the magnetic powder is less than 90° for all of the magnetic powder, since the magnetization of the powder are pointing to the direction of the magnetic field by the application of the pulse magnetic field previously. Thus the entanglement of the magnetic powder is avoided which results in a superior orientation.

As explained the above, according to the present invention, good orientation effect can be achieved without damaging the surface smoothness of the magnetic coating layer. Further the orientation according to the present invention is especially usefull for the magnetic tape having a high powder to binder ratio.

I claim as my invention:

1. A method of manufacturing a magnetic recording medium comprising the steps of;
   (a) preparing magnetic paint composed mainly of acicular magnetic powder, and binder uniformly dispersed in solvent,
   (b) coating said magnetic paint on a non-magnetic substrate to form a magnetic coating layer on a surface of said substrate,
   (c) applying orientation treatment to said magnetic coating layer to orient said magnetic powder along one direction, while said magnetic paint is still wet and said magnetic powder is movable in said magnetic paint,
   (d) drying said magnetic coating layer until said magnetic powder is fixed, wherein said orientation treatment being carried out by applying a pulse magnetic field along said one direction, being larger than coercive force of said magnetic powder, subsequently applying a D.C. magnetic field along the same direction and the same polarity as said pulse magnetic field.

2. A method according to claim 1, wherein said pulse magnetic field has a pulse width of not more than 25 msec.

3. A method according to claim 1, wherein said pulse magnetic field is applied to said magnetic coating layer at a number of times.

4. A method according to claim 1, wherein said pulse magnetic field is generated by a solenoid coil.

5. A method according to claim 1, wherein said pulse magnetic field is larger than coercive force of said magnetic powder but not more than 5 KOe.

6. A method according to claim 3, wherein said pulse magnetic field is applied to said magnetic coating layer by a plurality of solenoid coils, each generates a pulse magnetic field of one polarity.

7. A method according to claim 1, said D.C. magnetic field has a strength between 1000 and 3000 Oe.

8. A method according to claim 1, said D.C. magnetic field is a permanent magnet, or an electromagnet.

9. A method according to claim 8, said D.C. magnet is a solenoid coil supplied with a direct current.

* * * * *